US009850769B2

United States Patent
Steiner et al.

(10) Patent No.: US 9,850,769 B2
(45) Date of Patent: Dec. 26, 2017

(54) HULA SEAL

(71) Applicant: Ansaldo Energia Switzerland AG, Baden (CH)

(72) Inventors: Harald Steiner, Baden (CH); Yulia Smirnova, Adliswil (CH)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 0 days.

(21) Appl. No.: 15/383,524

(22) Filed: Dec. 19, 2016

(65) Prior Publication Data

US 2017/0175558 A1 Jun. 22, 2017

(30) Foreign Application Priority Data

Dec. 18, 2015 (EP) ..................................... 15201071

(51) Int. Cl.
| | | |
|---|---|---|
| *F01D 11/00* | (2006.01) | |
| *F16J 15/08* | (2006.01) | |
| *F23R 3/60* | (2006.01) | |
| *F02C 7/28* | (2006.01) | |
| *F23R 3/00* | (2006.01) | |

(52) U.S. Cl.
CPC ............. *F01D 11/003* (2013.01); *F02C 7/28* (2013.01); *F16J 15/0887* (2013.01); *F23R 3/002* (2013.01); *F23R 3/60* (2013.01); *F05D 2220/32* (2013.01); *F05D 2240/57* (2013.01); *F23R 2900/00012* (2013.01)

(58) Field of Classification Search
CPC .......... F16J 15/02; F16J 15/08; F16J 15/0887; F01D 11/005; F05D 2240/55; F05D 2240/57; F05D 2240/59
See application file for complete search history.

(56) References Cited

U.S. PATENT DOCUMENTS

| | | |
|---|---|---|
| 2004/0173975 A1 | 9/2004 | Hirst |
| 2008/0007008 A1 | 1/2008 | Hoebel et al. |
| 2010/0300116 A1 | 12/2010 | Kaleeswaran et al. |

FOREIGN PATENT DOCUMENTS

JP        2007-120340 A        5/2007

OTHER PUBLICATIONS

Extended European Search Report dated Mar. 6, 2016, issued by the European Patent Office in the corresponding European Patent Application No. 15201071.6-1751. (8 pages).

*Primary Examiner* — Gilbert Lee
(74) *Attorney, Agent, or Firm* — Buchanan Ingersoll & Rooney PC

(57) ABSTRACT

A hula seal as disclosed extends in a circumferential direction, a radial direction and an axial direction relative to a central axis. The hula seal includes a first leaf extending from the first edge region to the second edge region and a second leaf extending from the first edge region to the second edge region. The first leaf is the same distance as the second leaf from the central axis in the radial direction, and is adjacent to and overlaps the second leaf in the circumferential direction, when installed in a gas turbine. The first leaf is attached to the second leaf such that the first leaf can move relative to the second leaf in the circumferential direction when installed in a gas turbine.

8 Claims, 6 Drawing Sheets

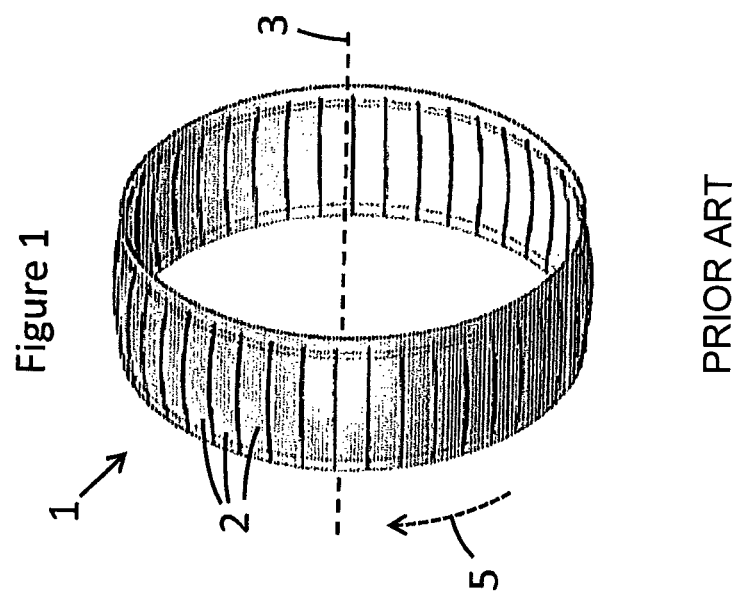

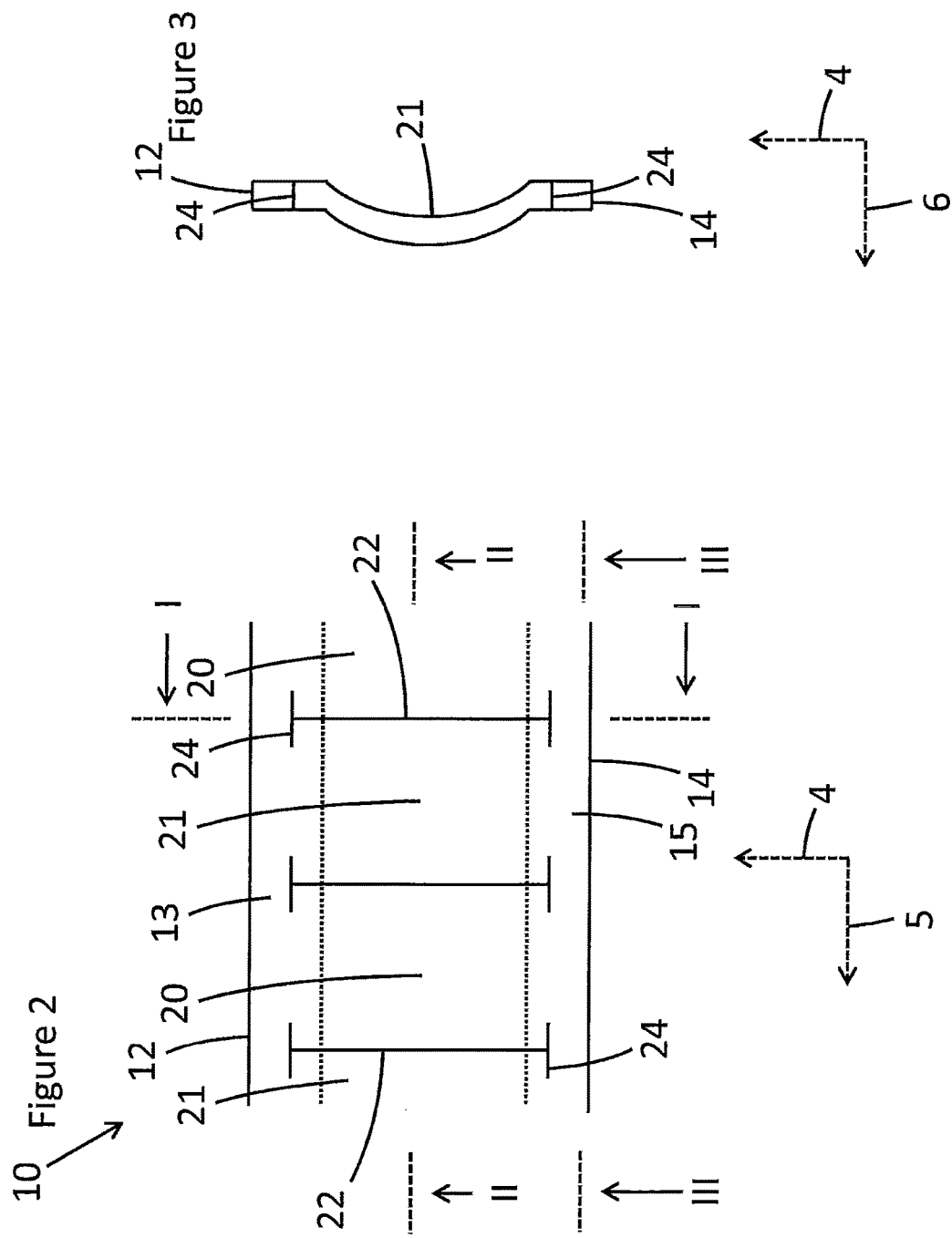

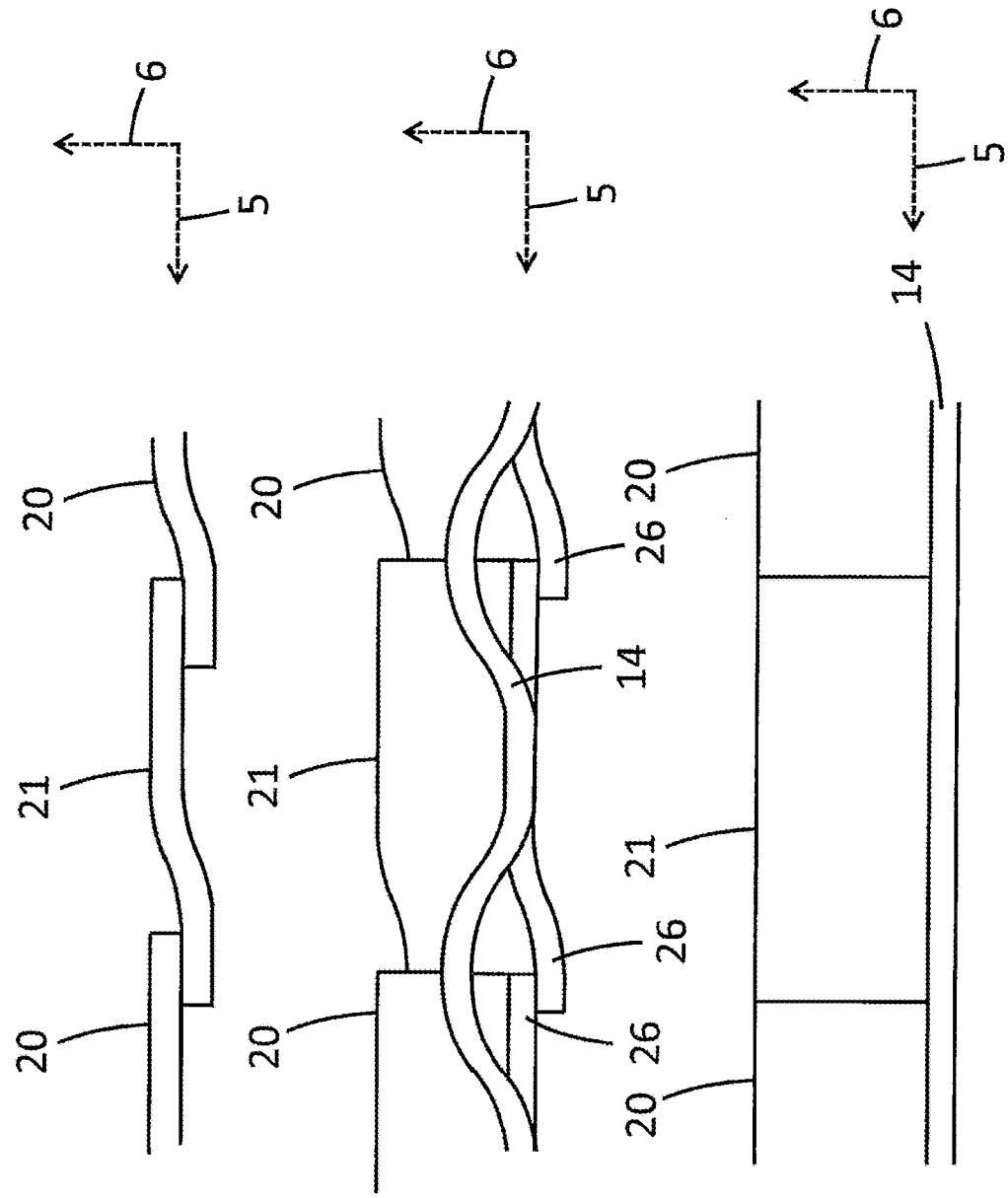

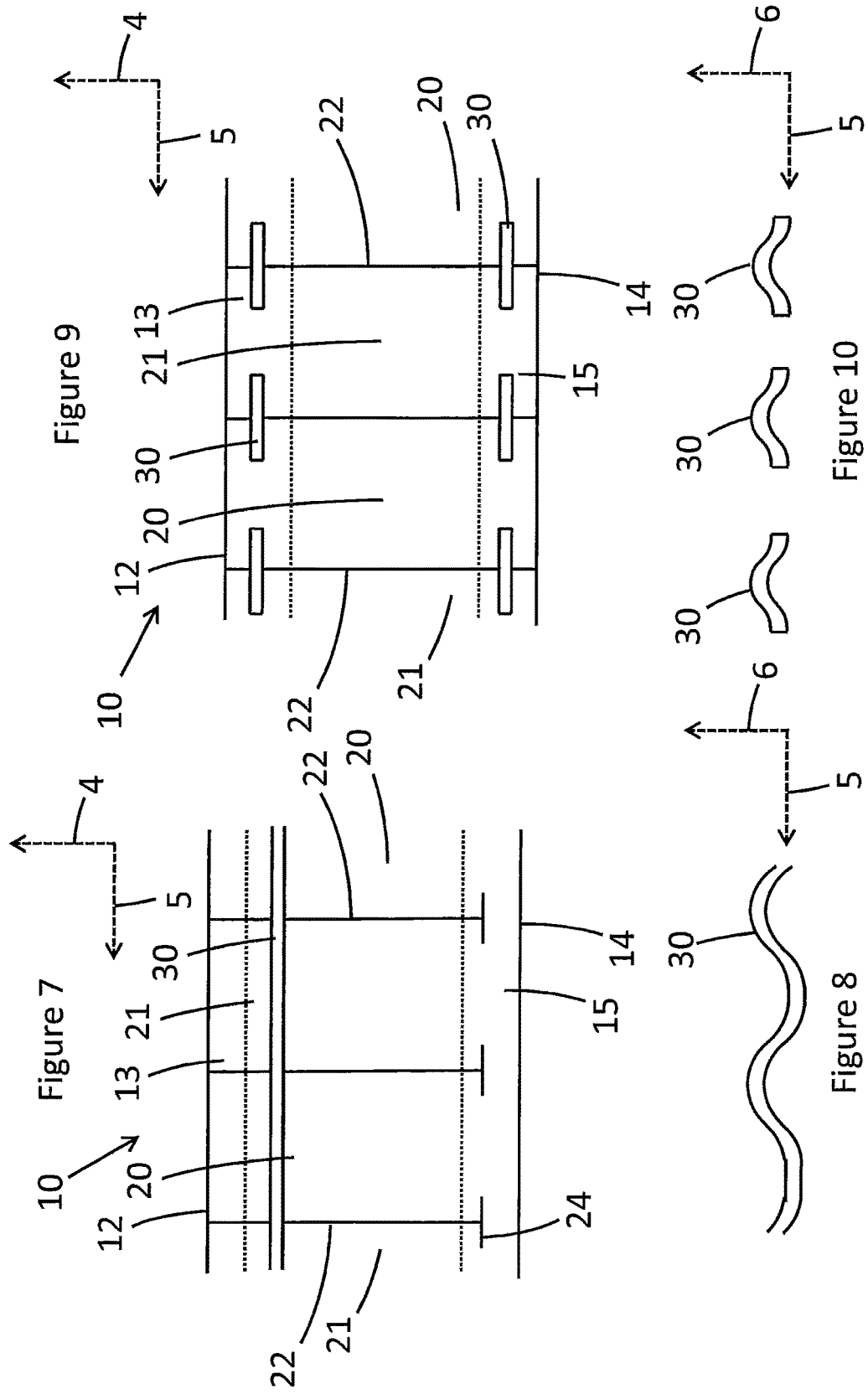

HULA SEAL

TECHNICAL FIELD

The present disclosure relates to hula seals, and particularly to hula seals with leaves that overlap one another when installed in a gas turbine.

BACKGROUND OF THE INVENTION

Hula seals are used in various places in gas turbines to seal gaps between adjacent gas turbine parts. FIG. 1 shows an existing hula seal 1. The hula seal comprises a plurality of leaves 2 extending around the circumference relative to a central axis 3. While hula seals such as that shown in FIG. 1 can provide good seals, a number of limitations have been appreciated. One particular issue lies with stress cracks. A hula seal may be made of a different material to the part to which it is attached. However, the temperature range that a hula seal is subjected to can easily be hundreds of degrees (e.g. from ambient temperature to 800 degrees Celsius). As a result of the differing materials and temperature variations during use of the gas turbine, the welds connecting the hula seal to the part can easily crack or fatigue cracks can occur in the hula seal.

SUMMARY OF THE INVENTION

A first aspect provides a hula seal, particularly for a gas turbine, extending in a circumferential direction, a radial direction and an axial direction relative to a central axis, the hula seal extending in the axial direction from a first edge region at a first edge to a second edge region at a second edge, the hula seal comprising a first leaf extending from the first edge region to the second edge region and a second leaf extending from the first edge region to the second edge region, in which the first leaf is the same distance as the second leaf from the central axis in the radial direction when installed in a gas turbine, the first leaf is adjacent to and overlaps the second leaf in the circumferential direction when installed in a gas turbine, and the first leaf is attached to the second leaf such that the first leaf can move relative to the second leaf in the circumferential direction when installed in a gas turbine.

This hula seal can reduce the stress in the hula seal and in the joint between the hula seal and the gas turbine component that the hula seal is attached to, particularly where the gas turbine component and the hula seal are made of materials with different thermal expansion coefficients and/or where the hula seal and the gas turbine part are at different temperatures or heat up or cool down at different rates during use. As a result, the hula seal can reduce high and low cycle fatigue cracks in the hula seal and can reduce failure of a welded joint between the hula seal and a gas turbine part.

The hula seal can also provide improved tolerance to expansion and contraction in the circumferential direction. As a result, it can reduce the extent of the enlargement of the gaps between adjacent leaves of a hula seal when the hula seal is stretched due to thermal expansion differences. In particular, twisting of the leaves, which tends to decrease sealing efficiency and which can be a problem in existing designs, can be reduced or avoided.

An embodiment provides a hula seal in which the first leaf and the second leaf are formed from a single piece of material. Providing a hula seal made of a single piece can provide a stiffer seal, which can improve performance.

In an embodiment, the first leaf and the second leaf are separated by a slit, and a further slit is provided extending from an end of the slit. Providing a further slit can reduce fatigue.

In an embodiment, the first leaf is directly attached to the second leaf. In an embodiment, the first leaf is attached to the second leaf by a connection piece that is attached to the first leaf and the second leaf.

In an embodiment, the first leaf is attached to the second leaf in the first edge region and in the second edge region. A hula seal such as that shown in FIG. 1, where the leaves are attached to each other at only one end, can be prone to individual leaves getting trapped and crumpled during assembly. Connecting the leaves together at both ends of the leaves can help avoid this problem.

A second aspect provides a gas turbine comprising a hula seal as described above. In one embodiment, the gas turbine comprises a gas turbine part, and the first leaf and the second leaf are directly attached to the gas turbine part.

BRIEF DESCRIPTION OF THE DRAWINGS

An embodiment of the invention will now be described by way of example only and with reference to the accompanying drawings in which:

FIG. 1 shows an existing hula seal;

FIG. 2 shows a top view of a section of a hula seal according to the invention, before the leaves have been put into an overlapping position;

FIG. 3 shows a view along I-I of FIG. 2;

FIG. 4 shows a cross section along II-II of FIG. 2 after the leaves have been put into an overlapping position;

FIGS. 5 and 6 show views along of FIG. 2 after and before the leaves have been put into an overlapping position;

FIG. 7 shows a top view of an alternative hula seal before the leaves have been put into an overlapping position;

FIG. 8 shows a side view of the connection strip of FIG. 7 after the leaves have been put into an overlapping position;

FIG. 9 shows a top view of another alternative hula seal before the leaves have been put into an overlapping position;

FIG. 10 shows a side view of the connection strip of FIG. 9 after the leaves have been put into an overlapping position;

DETAILED DESCRIPTION OF THE PREFERRED EMBODIMENTS

Figure 11:
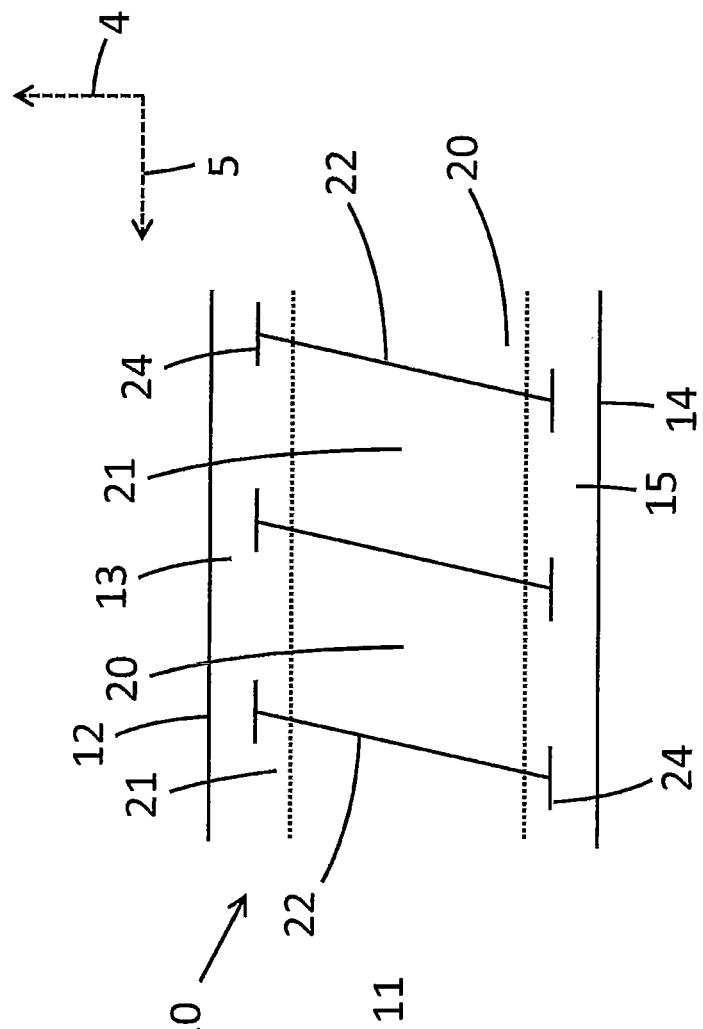
FIG. 11 shows a top view of another alternative hula seal before the leaves have been put into an overlapping position.

FIG. 2 shows part of a hula seal 10, extending from a first edge 12 to a second edge 14 in an axial direction 4 and extending in a circumferential direction 5. The hula seal is divided into leaves 20, 21 by slits 22 in between the leaves. The slits extend in the axial direction, but do not reach either edge. At each edge there is an edge region 13, 15 between the edge 12, 14 and the end of the slit 22. At each end of each slit, an end slit 24 extends perpendicular to the axial direction (and therefore parallel to the circumferential direction). Overall, each slit is therefore an I shape. In FIG. 2, the hula seal is shown in its unfolded state; this will be explained in more detail below.

FIG. 3 shows the view from the line I-I in the hula seal of FIG. 2. The width of a leaf 21 in the radial direction 6 can be seen, along with the curvature of the leaves in the axial direction 4. The dotted lines in FIG. 2 show the extent of this curvature (and therefore the extent of the edge regions 13, 15).

In FIGS. 2 and 3, the hula seal 10 is shown in its unfolded state; this is its shape before being folded and installed in a gas turbine. FIGS. 4 and 5 show the hula seal 10 once it is folded. FIG. 4 shows a cross-section along line II-II in FIG. 2, in which several leaves 20, 21 can be seen. The leaf 21 extends under one of the adjacent leaves 20 at one end of the leaf (in the circumferential direction), and at the other end of the leaf (in the circumferential direction), the adjacent leaf 20 extends underneath the leaf 21.

FIG. 5 shows a view along III-III of FIG. 2. The leaves 20, 21 can be seen behind the second edge 14. The edge 26 of the leaves 20, 21, which is visible due to the displacement of the second edge 14 and the second edge region 15, can also be seen. Each leaf overlaps the adjacent leaf, and as a result the edge 26 of each leaf is displaced in the radial direction 6 relative to the adjacent leaf. In the example shown in FIG. 5, this results in a surface (in a plane extending in the circumferential direction and the axial direction) that is not flat due to the displacement of the edges 26. This surface is normally attached to a gas turbine part and it is generally preferable that the surface is flat, so the edge 26 would generally be flattened, for example by grinding, to provide a flat surface.

As with FIG. 5, FIG. 6 shows a view along III-III of FIG. 2, but before the leaves have been put into an overlapping position. To allow for the adjacent leaves to overlap, the edge region 15 is a buckled shape in FIG. 5 as opposed to a flat shape in FIG. 6, with the portions of the edge region next to the end slit curving away to accommodate the leaf overlap.

FIG. 7 shows an alternative in which the slit 22 extends all the way to the first edge 12 (in the axial direction 4). A second edge region 15 adjacent to the second edge 14 is still present between the end slit 24 and the second edge 14. To connect the leaves, a connection strip 30 is attached to the leaves near the first edge. FIG. 8 shows a side view of the connection strip 30 after the leaves have been put in an overlapping position; the connection strip buckles in a similar fashion to the edge regions shown in FIG. 5.

FIG. 9 shows another alternative in which the slit 22 extends all the way to the first edge 12 and to the second edge 14, meaning that the leaves are effectively separate from one another. To join the leaves together, connection strips 30 are provided to connect adjacent leaves 20, 21. The connection strips in FIG. 9 are provided near both the first edge 12 and the second edge 14. FIG. 10 shows a side view of the connection strips 30 after the leaves have been put in an overlapping position; the connection strips buckle in a similar fashion to the edge regions shown in FIG. 5 and the connection strip in FIG. 8.

FIG. 11 shows another example similar to that in FIG. 2, but in which the slits 22 extend at an angle to the axial direction 4 rather than parallel to it. Providing angled slits can reduce flow through the seal if the flow impinging on the seal is no longer impinging perpendicular to the direction of the slit.

Figure 12:
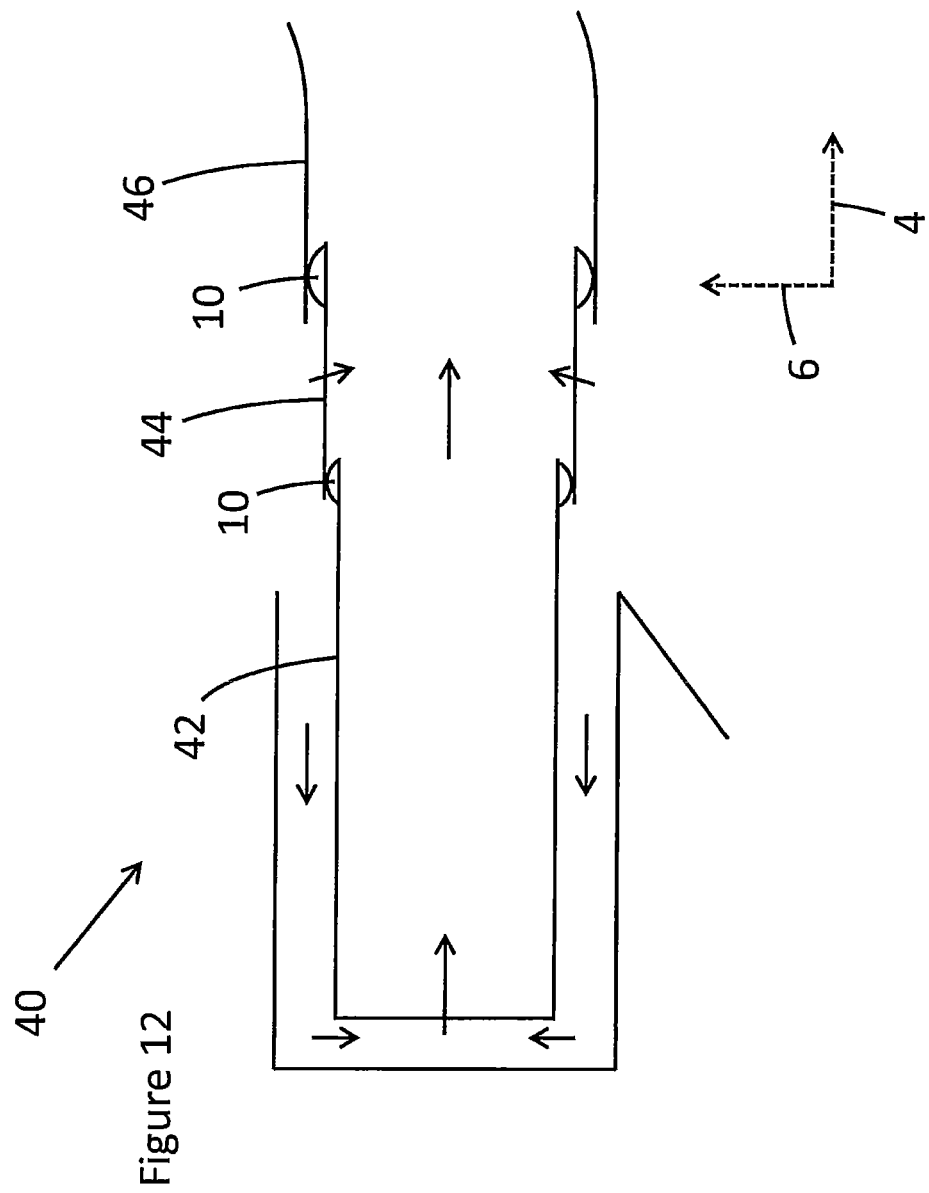
FIG. 12 shows a cross-section of part of a gas turbine combustor with hula seals as described above.

FIG. 12 shows part of a gas turbine combustor, the gas turbine combustor comprising a burner 42, a liner 44 and a transition piece 46. Hula seals 10 are attached to the liner 44 and provide a seal for the gap between the burner and the liner and the gap between the liner and the transition piece. For reference, arrows show roughly how fuel and gases pass through the combustor.

To install a hula seal as described herein into a gas turbine, the hula seal is first manufactured in a shape as shown in FIG. 2, 7, 9 or 11, for example, with the leaves adjacent to one another in the circumferential direction and with no overlap in the circumferential direction. The hula seal will normally then be bent to add the overlap between adjacent leaves in the circumferential direction. The hula seal is then attached to a gas turbine part, for example by welding or brazing.

Hula seals as described herein can be retrofitted to existing gas turbines. A laser cutter could be used to make the cuts when manufacturing a hula seal from a single piece of material.

A gas turbine comprises a compressor, a combustor downstream of the compressor and a turbine downstream of the combustor. The hula seal comprises at least two leaves, and will typically comprise many more than two. The hula seal may extend around a partial ring or a full ring, such as that shown in FIG. 1. Multiple partial ring hula seals may be provided to provide a complete ring of seals. It is not necessary to provide an overlap between every single pair of leaves, and the overlap may be provided between every third and fourth leaf, for example. The hula seal will typically be a one-layer seal, with a single layer of leaves extending in the circumferential direction rather than two layers with one layer further from the central axis than the other.

The hula seal can be made of a single (integral) piece of material in some embodiments, such as that shown in FIG. 2, where the edge regions 13, 15 connect the leaves 20, 21. In other embodiments, extra connection structures such as the connection strips shown in FIGS. 7 and 9 are provided. In an embodiment such as that shown in FIG. 9, the leaves will generally be cut from a single piece of material and attached back together using connection strips.

No attempt has been made to show the circumferential curvature in FIGS. 4 to 6, but generally the hula seal will curve continuously in the circumferential direction.

The first edge region 13 and the second edge region 15 are regions near the first edge 12 and the second edge 14 respectively of the hula seal. The first and second edge regions are typically the regions of the hula seal that are adjacent to the gas turbine part to which the hula seal is attached. In FIGS. 2, 3, 7, 9 and 11 this is the region between the edge and the dotted lines. Typically, the hula seal would be attached to the gas turbine part at one edge region, for example the second edge region, and would be in contact with the gas turbine part and free to move relative to the gas turbine part in the other edge region.

The leaves in a hula seal are generally all the same, and each leaf is normally curved as shown in FIG. 3. For ease of reference, any given leaf 20 is shown flanked on either side by two leaves 21 in the Figures. Although the leaves are not necessarily all identical, there is also not necessarily any difference between leaves 20 and leaves 21; this nomenclature is merely for ease of reference.

In FIG. 4, the leaf 21 extends under one of the adjacent leaves 20 at one end of the leaf (i.e. the leaf 21 overlaps in the circumferential direction and is closer to the central axis than the leaf 20). Alternatively, the leaf 21 could extend over one of the adjacent leaves 20. As another alternative, instead of bending the leaves into a slight S shape as shown in the cross section in FIG. 4, the leaves could retain a straight cross-section and simply be tilted slightly relative to the gas turbine part to allow for an overlap.

An overlap of the leaves in the circumferential direction means that for certain points in the circumferential direction both the leaves are present at different points in the radial direction.

The slits 22 may extend across the hula seal from the first edge region 13 to the second edge region 15 without reaching the first edge 12 or the second edge 14, as shown in FIG. 2. Alternatively, depending on the embodiment, the slits may reach to different points, for example one or both of the first edge and the second edge, as shown in FIGS. 7 and 9.

The end slit 24 is shown as extending parallel to the circumferential direction 5 in all of the examples above, and is also shown extending to both sides of the slit 22. Various alternatives to this are possible though; for example, the end slit may be curved and/or may extend only to one side of the slit. Providing a curved end slit may improve resistance to fatigue, particularly high cycle fatigue. The end slit is normally shorter than the slit 22.

The connection strips in the example in FIG. 9 only attach two adjacent leaves together, whereas the connection strip in FIG. 7 attaches more than two adjacent leaves together; the two designs are interchangeable in these examples.

As a minimum, leaves only need to be attached relative to one another by some kind of connection structure. In the examples given above, the attachment is provided by connection regions extending along the edge (first edge region and/or second edge region) or by a connection piece, in this case a connection strip or strips; these connections would normally be at or near the edge 12, 14 of the hula seal, for example in an edge region 13, 15. Various shapes and structures are possible for the connection pieces besides those described above.

In the examples above, each leaf is attached to the leaf on each side at two points, so at two attachment points. Having two attachment points between any given adjacent pair of leaves is likely to be preferable as it is likely to improve stability, but in some cases a single attachment point or three or more attachment points may be used between some or all of the leaves.

Various modifications to the embodiments described are possible and will occur to those skilled in the art without departing from the invention which is defined by the following claims.

REFERENCE NUMERALS

| | |
|---|---|
| 1 | existing hula seal |
| 2 | leaf |
| 3 | central axis |
| 4 | axial direction |
| 5 | circumferential direction |
| 6 | radial direction |
| 10 | hula seal |

-continued

REFERENCE NUMERALS

| | |
|---|---|
| 12 | first edge |
| 13 | first edge region |
| 14 | second edge |
| 15 | second edge region |
| 20 | first leaf |
| 21 | second leaf |
| 22 | slit |
| 24 | end slit |
| 26 | edge30 connection strip |
| 40 | gas turbine combustor |
| 42 | burner |
| 44 | liner |
| 46 | transition piece |

The invention claimed is:

1. A hula seal extending in a circumferential direction, a radial direction and an axial direction relative to a central axis, the hula seal extending in the axial direction from a first edge region at a first edge to a second edge region at a second edge, the hula seal comprising:
   a first leaf extending from the first edge region to the second edge region and a second leaf extending from the first edge region to the second edge region, wherein:
   the first leaf is a same distance as the second leaf from the central axis in the radial direction when installed in a gas turbine;
   the first leaf is adjacent to and overlaps the second leaf in the circumferential direction when installed in a gas turbine; and
   the first leaf is attached to the second leaf such that the first leaf can move relative to the second leaf in the circumferential direction when installed in a gas turbine.

2. The hula seal of claim 1, in which the first leaf and the second leaf are formed from a single piece of material.

3. The hula seal of claim 1, in which the first leaf and the second leaf are separated by a slit, and in which a further slit extends from an end of the slit.

4. The hula seal of claim 1, in which the first leaf is directly attached to the second leaf.

5. The hula seal of claim 1, in which the first leaf is attached to the second leaf by a connection piece that is attached to the first leaf and the second leaf.

6. The hula seal of claim 1, in which the first leaf is attached to the second leaf in the first edge region and in the second edge region.

7. A gas turbine comprising:
   a hula seal according to claim 1.

8. The gas turbine of claim 7, in which the gas turbine comprises:
   a gas turbine part; and
   the first leaf and the second leaf are directly attached to the gas turbine part.

* * * * *